3,499,940
FLUORINATED DIOLS
Atsuo Katsushima, Fuse-shi, Iwao Hisamoto, Suita-shi, and Shoshin Fukui, Takahisa Kato, and Masayuki Nagai, Osaka-fu, Japan, assignors to Daikin Kogyo Kabushiki Kaisha, Osaka-shi, Japan
No Drawing. Filed Mar. 30, 1966, Ser. No. 538,575
Claims priority, application Japan, Apr. 7, 1965, 40/20,654; May 20, 1965, 40/29,978, 40/29,979
Int. Cl. C07c 31/34
U.S. Cl. 260—633                                        4 Claims

ABSTRACT OF THE DISCLOSURE

Fluorinated diols of the formula $$R_fCH_2CH-CH_2OH$$
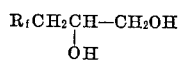

wherein $R_f$ is a perfluoroalkyl group of 5 to 15 carbon atoms suitable for treating solid materials to render them oil-repellent but hydrophilic.

---

This invention relates to a novel and useful class of fluorinated diols and to organic solvent solutions or dispersions thereof suitable for treating solid materials, such as, fibrous materials, to render them oil-repellent but hydrophilic.

Oils have smaller surface tension and higher wettable property on solid materials compared with water. Accordingly the solid materials treated with the conventional water repellents exhibit water repellency but no oil repellency, necessitating treatment by a specific oil-repellent for imparting oil-repellent property to such materials. Such fluorocarbon compounds as chromium complex compounds of fluorinated carboxylic acid and polymers of acrylate having a perfluoroalkyl or polyfluoroalkyl group have been known as oil-repellents for solid materials. When the solid materials are treated with such compounds, however, water which is less wettable on the solid surface than the oil is repelled as well as the oil is, thus rendering the treated surface not only oil-repellent but also water-repellent. In other words, the solid surface treated with the conventional oil-repellent generally exhibits water-repellency as well as oil-repellency, and it has been deemed impossible to obtain the solid surface which is oil-repellent but wettable in water. In fact, when filter cloth and other porous materials are treated with the publicly known fluorinated oil-repellent both oil and water are sustained without infiltration.

There are often required in the various fields of art such solid surfaces as being wettable in water but not in oil. With such filter cloth, for instance, as infiltrating water but no oil, such a mixture of oil and water can be easily separated by a simple operation.

As the result of lasting investigation by the inventors for accomplishing the manufacture of useful compounds which impart oil-repellency and impart or increase hydrophilic property of the materials treated to meet the specific requirement as aforementioned, it has been discovered that the fluorinated diols as expressed by the general formula:

$$R_fCH_2CHCH_2OH$$
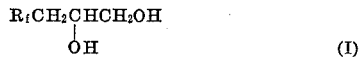
(I)

wherein $R_f$ is a straight-chain or branched-chain perfluoroalkyl group of 5 to 15 carbon atoms has such a unique property.

In the prior art it has been generally understood that those fluorinated compounds having oil-repellent property have water repellency as well, and those which are hydrophilic have no oil-repellency as above mentioned, whereas the fluorinated diols of the present invention, to be expressed by the above general Formula I have broken down such a common sense by imparting excellent oil-repellency and hydrophilic property to solid materials.

The characteristic properties of the compounds of the invention are presumed to be due to a specific chemical structure having one perfluoroalkyl group expressed as $R_f$ and two hydroxyl groups. The number of carbon atoms of the perfluoroalkyl group affects the unique property and the easiness of synthesis, and with carbon atoms in a range of 5 to 15 only said compound impart hydrophilic and highly oil-repellent properties, and the synthesis is also easy. With carbon atoms less than 4 oil-repellent effect is lowered and with carbon atoms more than 16 the synthesis thereof becomes difficult, and a range of 7 to 11 carbon atoms is particularly desirous. Said perfluoroalkyl group may be either of a straight-chain or of a branched chain such as

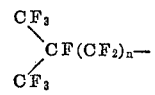

wherein $n$ is an integer of 2 to 12.

The compounds of the invention as expressed by the above general formula are liquid or solid at a room temperature and soluble in one or more of organic solvents, for example, ketones such as acetone and diethylketone, alcohols such as methanol and ethanol, esters such as methyl acetate and ethyl acetate, ethers such as diethylether, dioxane and tetrahydrofuran, and acid amide derivatives such as acetonitrile and dimethylformamide.

The oils according to the specification include oils of mineral animal and vegetable origin such as kerosene oil, heavy oil, machine oil, watch oil, refrigerator oil, vacuum pump oil, washing oil, motor oil, frying oil, etc., alkanes and cycloalkanes having more than 6 carbon atoms such as hexane, heptane, octane, cyclohexane, etc., and haloalkanes and haloalkenes such as carbontetrachloride, perchloroethylene, etc.

The fluorinated diols of the invention can be manufactured by various methods. One typical method of the synthesis consists of reacting the compound, written as $$R_fCH_2CHXCH_2OH \qquad (II)$$

wherein $R_f$ is same as above and X is a halogen, with fuming sulphuric acid and then hydrolyzing the reaction product. The former reaction can be advantageously carried out at a temperature, 10 to 40° C. or thereabout, and fuming sulphuric acid to be used only needs to contain more than 10 percent of $SO_3$, most desirable being 30 to 80 percent. The desirable proportion of fuming sulphuric acid and the compound (II) above varies from 1:1 to 20:1, particularly from 5:1 to 10:1. The reaction can be usually completed in 30 minutes to 20 hours, generally 1 to 5 hours. The hydrolysis reaction of the reaction product is usually carried out in an aqueous alkaline solution of alkali sulfite, etc. at a desirable temperature of 20 to 50° C. or thereabout. To be more particular, the reaction is conducted by adding an aqueous alkaline solution of a suitable concentration to the product from the prior process at 20 to 50° C. or thereabout and collecting liberated halogens, after which diluting the product with abundant water and further stirring the mixture at the same temperature for 1 to 2 hours or thereabout. The starting compound (II) used in the above reaction is known in the art and can be obtained by various methods such as the addition reaction of a compound shown as $R_fX$ ($R_f$ and X are same as above) to allyl alcohol ($CH_2$=$CHCH_2OH$).

Another desirable method for synthesizing the compound of the invention consists of the reaction of the compound to be expressed as

(III)

wherein $R_f$ is same as above, with sulphuric acid. According to this method, the starting compound (III) above and sulphuric acid are reacted by stirring the mixture at a temperature between room temperatures and reflux temperatures. The higher the temperature the higher is reaction velocity, generally, thus a reflux temperature being most desirable. The concentration of sulphuric acid used may vary from 1 to 70 percent by weight. With higher concentration thereof the reaction velocity and byproduct as well are increased and selectivity is liable to be lowered at the same time. The most desirable concentration lies between 5 to 30 weight percent. The proportion of the compound (III) above and sulphuric acid can be freely selected from a wide range, generally sulphuric acid in excess being desirable. The starting compound (III) above can be obtained, for instance, by the dehydrohalogenation of a compound of the formula

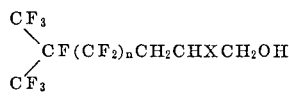

The solid surface treated with the compound of the invention exhibits hydrophilic and oil-repellent properties. In treating the solid material the compound of the invention can be used in any desirable forms such as an organic solvent solution, dispersion, etc., by mixing an effective amount of said compound with one or more of suitable diluents such as a solvent, liquid dispersing medium, etc. There may be also added a suitable adjuvant such as propellant, coloring agent, as required.

The solution can be easily prepared by dissolving at least one of the compounds of the invention in one or more of the afore-exemplified solvents. By adding propellants such as dichlorodifluoromethane, trichlorofluoromethane, chlorodifluoromethane, methylchloride, propane, etc., to said solution in a pressure container, a self-pressurized sprayable product, i.e., "aerosol," can be prepared. The aqueous dispersion can be prepared by dispersing at least one of the compounds of the invention in water in the presence of or absence of a suitable dispersant. The suitable concentration of the fluorinated diols contained in said composition can be selected from a wide range, depending upon the nature and uses of the solid material to be treated, the best results being usually obtained at concentration of 0.1 to 10 weight percent, preferably 0.5 to 5 weight percent.

Various solid materials such as textile, resin, metal, timber, leather, glass, asbestos, etc., can be treated with the compound of the invention rendering them oil-repellent and hydrophilic. Particularly, the compounds of the invention give the best results for treating porous or non-porous materials, such as yarn, cloth, paper, unwoven cloth, knitted cloth, film, plastic moldings, etc., made of or containing high molecular weight polymeric substances having an hydroxyl group, such as cellulose, polyvinyl alcohol, starch and the like.

Said solid materials may be treated by the various conventional methods, such as coating, dipping, spraying, etc., and then dried. The temperature for drying should be limited to under 80° C. to prevent the loss by vaporization of the fluorinated diol, a range of between a room temperature and 80° C. being desirable. When porous materials such as paper, cloth, unwoven cloth, etc. are treated, these materials are generally impregnated with the compound of the invention, giving a particularly desirable result.

As apparent from the foregoing description, the material treated with the compound of the invention has a peculiar character of being wettable by water but repelling oil. Accordingly, the filtering material which has been treated with the compound of the invention has great advantage of being capable of removing easily and reliably water content from oils containing water, without infiltrating the oil. The above unique property of the compound can be further utilized in various technical fields such as imparting a specific sizing effect to paper, printing, etc.

By further treating the solid surface obtained by treating with the compound of the invention, with isocyanates such as tolylenediisocyanate, or acid chlorides such as stearic chloride, it is also possible to convert its hydrophilic property to water-repellent property, thus offering an advantage of changing the property according to its uses.

For better understanding of the invention, examples of synthesizing the compounds of the invention and treating methods are given hereunder.

EXAMPLE 1

A 1-liter, 4-necked flask, equipped with a reflux condenser, thermometer, agitator and dropping funnel, was charged with 164 g. (0.385 mol) of

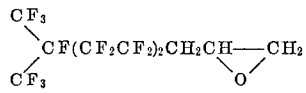

and stirring the content at 70 to 80° C., 738 g. of 30 weight percent aqueous solution of sulphuric acid was slowly added dropwise in 1 hour. When completely added the system was further stirred at reflux temperature for 4 hours. After the reaction the mixture was diluted with one liter of water and the organic layer at the bottom was separated and washed with 1 liter of water for 3 times in slightly acidic condition. The water layer was fully extracted with ether, and the ether extract was mixed with said washed organic layer and dried with anhydrous $Na_2SO_4$. By distillation thereof 142 g. of a distillate of boiling point of 110 to 112° C./3 mm. Hg and 24 g. of a residue were obtained. The distillate was confirmed by gaschromatographic analysis to consist, substantially of a simple substance, and by infrared spectroscopic analysis to show absorptions at 2.95 to 3.03$\mu$ due to —OH, and at 3.40$\mu$ due to —CH$_2$—, and elementary analysis gave the following results.

Calcd. ($C_{10}F_{15}H_7O_2$) (percent): C, 27.0; F, 64.2; H, 1.57. Found (percent): C, 26.3; F, 64.0; H, 1.60.

Thus the product was confirmed to be

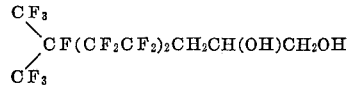

A yield rate was 83.0%.

One gram of said compound was dissolved in 50 cc. of acetone and placed in a pressure bottle into which 50 cc. of a mixture of dichlorodifluoromethane and trichlorofluoromethane at 75:25 weight ratio were injected, thus preparing the aerosol thereof. The composition thus prepared was sprayed on bleached cotton cloth and dried at room temperature for 3 minutes.

The cotton cloth apparently showed no change by the treatment, but when a mixture of water and n-heptane was filtered therethrough water was directly infiltrated, n-heptane being completely sustained on the cloth. After 2 days the n-heptane remained on the cloth without any infiltration. The water thus separated was completely free of n-heptane and transparent and odourless.

EXAMPLE 2

In the similar manner to Example 1, 626 g. (1.00 mol) of

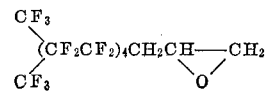

(boiling point 132–137° C./11–14 mm. Hg) and 400 g. of 40 weight percent aqueous solution of sulphuric acid were stirred at 110° C. for 6 hours, producing 511 g. of

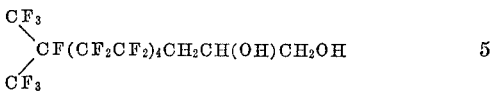

being a distillate of boiling point, 128–133° C./2.0–2.5 mm. Hg at the yield rate of 79.4 mol percent.

A glass cloth was dipped in a 1 weight percent acetone solution of the product and dried at room temperature for 3 minutes. The glass cloth thus treated showed no change in appearance, but when a mixture of water and kerosene oil was filtered therethrough water was directly infiltrated, kerosene oil being sustained on the cloth without any infiltration.

EXAMPLE 3

In the same manner as Example 1, 250 g. (0.588 mol) of

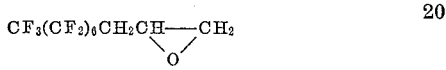

(boiling point, 41° C./1.0 mm. Hg) and 184 g. of weight percent aqueous solution of sulphuric acid were stirred at reflux temperature for 5 hours, producing 236 g. of 27 $CF_3(CF_2)_6CH_2CH(OH)CH_2OH$, a distillate of boiling point, 111–114° C./2.8–3.2 mm. Hg at the yield rate of 90.4 mol percent.

Said compound was dissolved in acetone to a concentration of 1 weight percent whereby the treating composition of the invention was prepared.

A gabardine cloth consisting mainly of polyvinylalcohol fiber was treated with the above composition, and was found to sustain machine oil without infiltration but to wet in water.

EXAMPLE 4

A 300 cc. flask equipped with a thermometer, agitator, dropping funnel and cooling bath was charged with 166 g. (0.3 mol) of

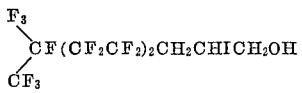

and stirring the content and cooling with ice water, 320 g. of 70 percent fuming sulphuric acid was added dropwise in 1 hour, and the reaction temperature maintained at 15–35° C. For 40 minutes after the complete addition the mixture was violently stirred, producing a reaction mixture in the form of a blackish brown muddy substance. Further, the reaction mixture was dropped in about 30 minutes into a 2,000 cc. flask holding, 1,200 cc. of aqueous solution containing 20 g. of $Na_2SO_3$ with continuous stirring at a reaction temperature of 20 to 50° C. maintained by cooling with ice water. For further 30 minutes after the above operation stirring was continued at a room temperature, and the resultant mixture was extracted with ether. The ether extract was distilled, whereby a distillate of boiling point, 98–102° C./1.5 mm. Hg was obtained, which was a white solid of melting point of 40–41° C.

The resultant product was confirmed by infrared spectroscopic, elementary and gas chromatographic analyses to be

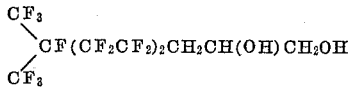

In 1.5 percent acetone solution of the above product stainless steel wire gauze was dipped and dried at a room temperature, which sustained kerosene oil and frying oil without infiltration while infiltrating water.

EXAMPLE 5

In the same reactor as Example 4, 136 g. of

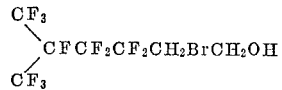

and 284 g. of 30 percent fuming sulphuric acid were mixed and violently stirred at a temperature of 20 to 40° C., being maintained with ice water for 2 hours. The resultant mixture was dropped in 5 hours into 1,200 cc. of aqueous solution containing 20 g. of $Na_2SO_3$ at a temperature of 20 to 40° C. The mixture was extracted with ether and the extract was distilled to separate 95 g. of a distillate of boiling point, 79–81° C./2 mm. Hg. Said distillate was confirmed by infrared spectroscopic, elementary and gas chromatographic analyses to be

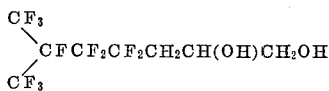

Filter paper was dipped in a 1 percent acetone solution of the above compound and dried at a room temperature. The filter paper thus treated infiltrated water only from mixtures of water and kerosene oil, frying oil and machine oil, respectively and the oils remained on the treated filter paper, and the condition remained unchanged for 3 days.

What we claim is:

1. A fluorinated diol having the general formula:

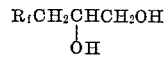

wherein $R_f$ is a perfluoroalkyl group of from 5 to 15 carbon atoms.

2. The fluorinated diol claimed in claim 1, wherein $R_f$ is a perfluoroalkyl group of from 7 to 11 carbon atoms.

3. The fluorinated diol claimed in claim 1, wherein $R_f$ is a straight-chain perfluoroalkyl group of from 5 to 15 carbon atoms.

4. The fluorinated diol claimed in claim 1, wherein $R_f$ is a branched-chain perfluoroalkyl group of the formula

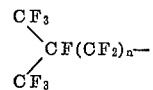

wherein $n$ is an integer of from 2 to 12.

References Cited

UNITED STATES PATENTS

| | | | |
|---|---|---|---|
| 3,171,861 | 3/1965 | Ahlbrecht | 260—633 |
| 3,337,644 | 8/1967 | Drysdale | 260—633 |

FOREIGN PATENTS 1,475,237  2/1967  France.

OTHER REFERENCES

Park et al.: J. Org. Chem., vol. 26, pp. 2089–2095, 1961.

BERNARD HELFIN, Primary Examiner

HOWARD T. MARS, Assistant Examiner

U.S. Cl. X.R.

106—2; 117—124, 126, 127, 138.8, 139.5, 140, 142, 147, 154